Figure 1:
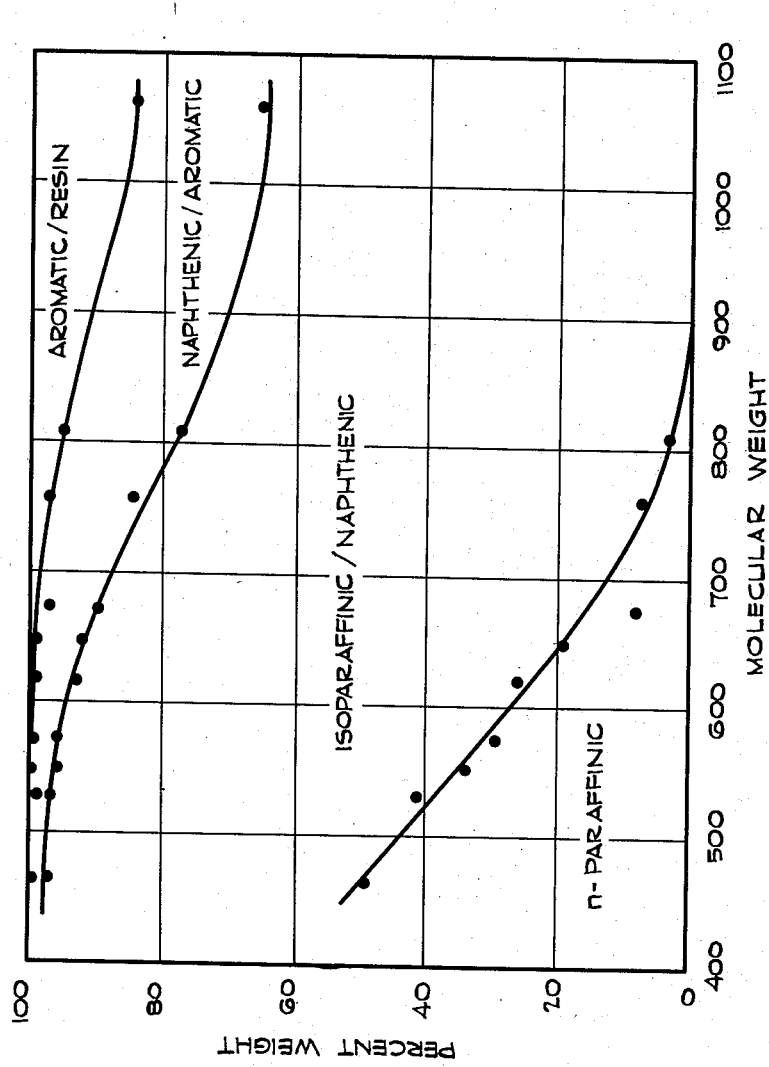

Feb. 2, 1954

K. G. ARABIAN 2,668,140

PREPARATION OF PARAFFIN WAXES

Filed May 24, 1950

3 Sheets-Sheet 1

INVENTOR: KAREKIN G. ARABIAN

BY: John H. Colvin

AGENT

Feb. 2, 1954  K. G. ARABIAN  2,668,140
PREPARATION OF PARAFFIN WAXES
Filed May 24, 1950  3 Sheets-Sheet 2
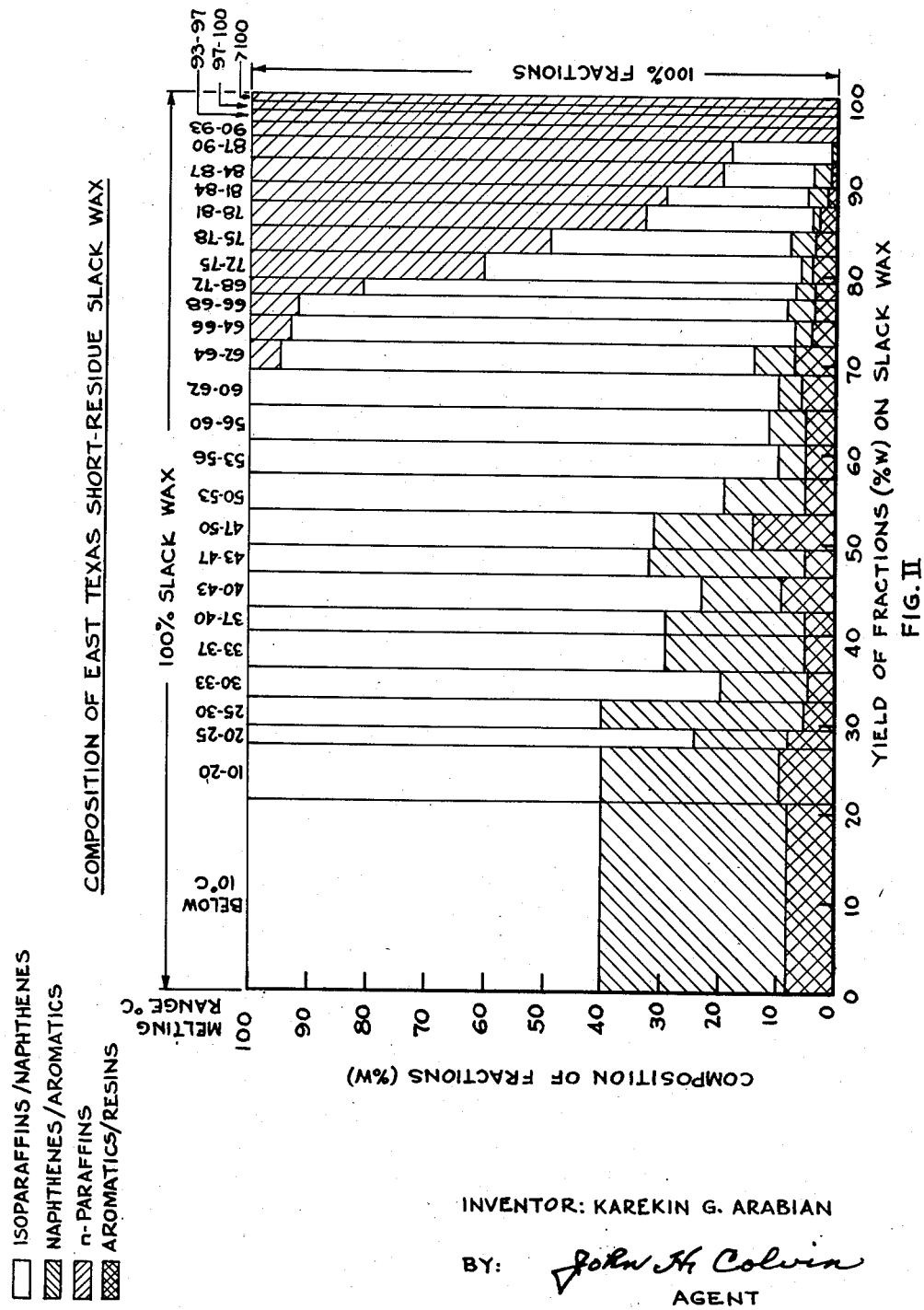
INVENTOR: KAREKIN G. ARABIAN
BY: John H. Colvin
AGENT Feb. 2, 1954  K. G. ARABIAN  2,668,140
PREPARATION OF PARAFFIN WAXES
Filed May 24, 1950  3 Sheets-Sheet 3
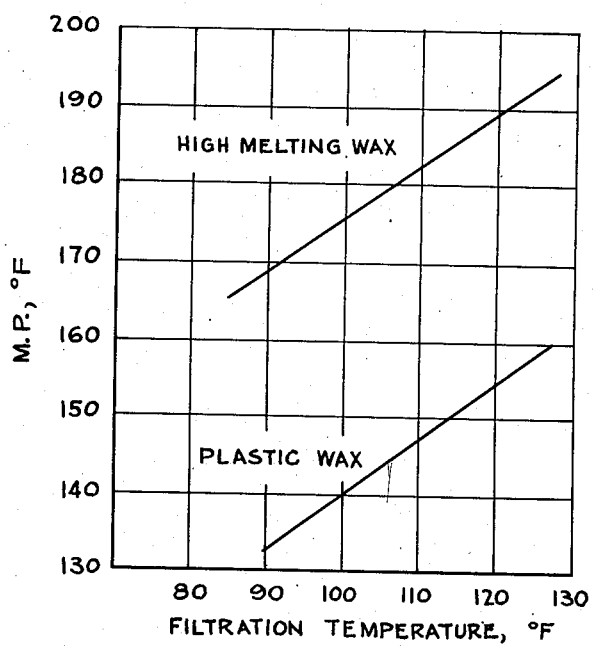
FRACTIONATION OF MICROCRYSTALLINE WAX
FIG. III
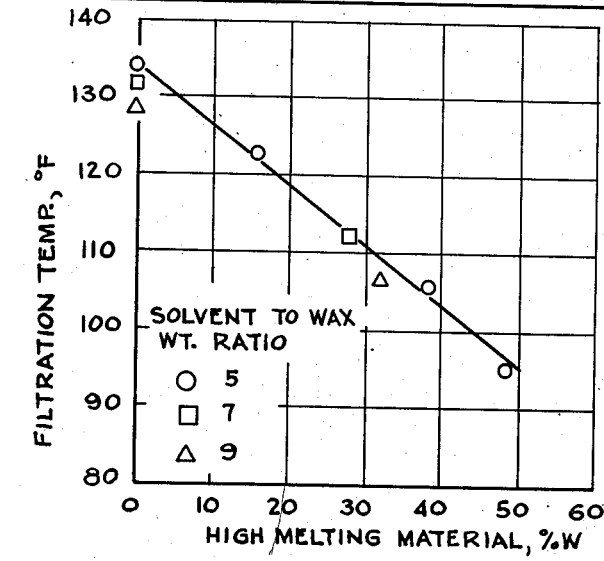
FRACTIONATION OF MICROCRYSTALLINE WAX
FIG. IV
INVENTOR: KAREKIN G. ARABIAN
BY: *John H Colvin*
AGENT Patented Feb. 2, 1954

2,668,140

UNITED STATES PATENT OFFICE 2,668,140

PREPARATION OF PARAFFIN WAXES

Karekin G. Arabian, Houston, Tex., assignor to Shell Development Company, San Francisco, Calif., a corporation of Delaware Application May 24, 1950, Serial No. 163,937

9 Claims. (Cl. 196—18)

This invention relates to hydrocarbon waxes and to their preparation. More particularly, it is concerned with high melting waxes and their preparation from petroleum distillation residues, and especially with high melting, hard, crystalline petroleum waxes which may be obtained from distillation residues of petroleum oils of a mixed base character, and with high melting plastic waxes which may be produced concurrently therewith from the same petroleum residue.

Generally, hydrocarbon waxes are produced (separated) from oily wax masses recovered from petroleum lubricating oil base stocks during the treatment of such lubricating oil stocks to remove therefrom materials which markedly reduce the fluidity of the oil when it is cooled to low temperatures, such as 0° C. and the like. In order to produce lubricating oils with given viscosity characteristics, the base stock is generally first separated into different fractions by distillation, under reduced pressure, and the distillate fractions, as well as the residual fraction, are subsequently "dewaxed" to remove the higher melting hydrocarbons present and to produce an oil with a suitable pour point. In the case of stocks which contain aromatic and resinous materials, these are usually removed by de-asphalting with a light-boiling hydrocarbon and extracting with a selective solvent, such as furfural, phenol, and the like, such treatment being generally carried out before the dewaxing. The dewaxing may be effected simply by chilling the waxy oil fraction to crystallize the higher melting hydrocarbons present therein, and pressing, filtering or centrifuging to separate the oil from the wax, which is called "slack" wax or crude wax and which is an oily wax mass of solidified hydrocarbons and liquid hydrocarbons entrained therewith. By the well-known "sweating" operation, the oils (liquid hydrocarbons) may be at least partially removed from the slack or crude wax, thereby yielding a harder wax product, the so-called "scale" wax, and a still more oily wax product, termed "slop" wax, which is a soft wax. Essentially the same separations may be effected in the presence of an inert diluent, such as a light hydrocarbon—propane, butane, and the like—or in the presence of various organic solvents which may exert preferential solvent action for one type of hydrocarbons present over another type present, such as methyl ethyl ketone, acetone, benzene, toluene, and the like, and mixtures thereof, as is well known and practiced in the art, with appropriate selection of dewaxing temperatures for the waxy oil and of de-oiling temperatures for de-oiling the oily wax.

The lower melting paraffin waxes are obtained from the lower boiling distillate fractions, while the higher melting paraffin waxes are derived from the higher boiling distillate fractions. However, the hardness of the deoiled distillate wax becomes less as the heavier, i. e., higher boiling and higher molecular weight distillate fractions are utilized as a source of the wax. In the case of the residual material from the vacuum distillation, the waxes obtained therefrom are of still higher molecular weight, but appear to be of an entirely different character, their nature being such that a mass thereof is obtained which to the unaided eye appears to have no crystalline character and to be amorphous, having somewhat plastic characteristics and having refractive indices indicating the principal components to be non-straight chain hydrocarbons and to be a mixture of isoparaffinic, naphthenic and aromatic hydrocarbons. Magnification reveals a microcrystalline structure, hence the name "microcrystalline" wax. Heretofore, if the presence of high melting, hard, crystalline waxes in such microcrystalline waxes even in minor proportions was suspected, no satisfactory means of separating them, particularly in practical commercial quantities, was known.

It has been proposed in U. S. Patent No. 2,306,201 to prepare high melting, oil-free, ductile hydrocarbon waxes from high boiling waxy materials of the character of distillation residues by removing by distillation under vacuum all of the material having a flash point of at least 500° F., and then to dissolve the 20% to 50% bottoms therefrom in ethylene dichloride and precipitate a suitable high melting, ductile wax from the solution at a temperature of about 80° F. The wax thus obtained has a refractive index which clearly characterizes it as being essentially free from straight-chain paraffin hydrocarbons. Although higher melting waxes may be obtained by this process, they are still microcrystalline in character and are not suitable for those uses where crystalline waxes are desired, though being admirably suited to other uses as disclosed in said patent. However, there are applications for hydrocarbon waxes where it is desirable that the wax have a higher melting point than that of the crystalline paraffin waxes obtainable from the distillate fractions and yet have hardness and other physical characteristics corresponding to those of the crystalline paraffin waxes and not of the microcrystalline waxes.

It is, therefore, a principal object of the present invention to produce high melting point, crystalline waxes from petroleum stocks. A further object is to devise an economical and effective process whereby such high melting, crystalline waxes may be recovered from higher molecular weight fractions of petroleum oil stocks. A still further object is the production of high melting, crystalline, paraffin waxes from petroleum residual stocks. A concomitant object is to prepare an improved plastic, high melting, wax from petroleum residual stocks. These objects will be better understood, other objects will appear, and the attainment of them made clear from the description of the invention.

It has now been found that high melting point, hard, crystalline paraffin waxes may be obtained from high molecular weight petroleum waxy residual fractions by fractional crystallization of the high melting point, crystalline waxes from a liquid mixture of the waxy material at a sufficiently high temperature selected to precipitate from the liquid mixture a high melting point, hard, crystalline paraffin wax composed of a mixture of hydrocarbons which, for the most part, as about 90% by weight or more, are straight-chain paraffin hydrocarbons as evidenced by their melting point-refractive index relationships.

The separation of the high melting, hard, crystalline waxes is advantageously and preferably effected by dissolving the residual waxy mixture (preferably after separation of the waxes present from the major proportion of the oil components of the waxy residue, as by the usual dewaxing and deoiling operations, which dewaxing and deoiling are effected subsequent to application of well known deasphaltizing operations if desired, as in the case of distillation residues which contain appreciable proportions of asphaltic bodies) in a suitable diluent, such as a light liquid hydrocarbon, but preferably in an organic solvent, such as methyl ethyl ketone in admixture with benzene, which mixture has some preferential solvent powers for non-straight chain paraffin hydrocarbons as compared with the solvent power for straight chain paraffin hydrocarbons, adjusting the temperature of the solution to a suitable temperature, which temperature is usually about 100° F. or higher, and is selected to precipitate from the solution the high melting point, hard, crystalline paraffin wax and consisting for the most part only of straight-chain paraffin waxes. After separation of the precipitated crystalline wax from the solution, as by filtration or centrifugation, the remainder of the wax is obtained from the separated solution either by distillation to remove the solvent or by cooling the solution to a suitable lower temperature, such as the temperature at which the residual wax mixture had been previously deoiled, such as about 40°–60° F., followed by separation of the precipitated wax product from the solvent, thereby yielding a high melting, plastic-like, highly ductile wax product of a microcrystalline character and composed, for the most part, of iso- or branched-chain paraffinic hydrocarbons, and naphthenic hydrocarbons with a minimum of straight-chain paraffin hydrocarbons present.

The waxes of the present invention may be obtained from petroleum oils derived from different sources or localities and having different specific characteristics, the only requirement being that the oil be of a paraffinic or paraffinic-naphthenic character, that is, that it contain paraffinic hydrocarbons of high molecular weight, including normal and iso-paraffinic hydrocarbons with or without naphthenic hydrocarbons. Generally, the stock material is preferably a so-called mixed base oil, in that it is largely paraffinic and naphthenic in character, although containing appreciable amounts of asphaltic materials as well as non-asphaltic, aromatic hydrocarbons. The invention is particularly applicable to waxy residues obtained from crudes of the character of East Texas crudes, which are valuable lubricating oil base stocks, the recovery of which lubricating oils therefrom yields substantial proportions of hydrocarbon waxes.

The invention will be better understood from a more detailed description thereof as applied to some particular material, such as distillation ressiduum from an East Texas crude stock, which description will be made with reference at times to the accompanying drawings, wherein:

Fig. I is a graphical representation of the composition of East Texas short residue slack wax, showing the percentages of the various types of components present as a function of their molecular weights;

Fig. II is a graphical representation of the composition, by melting range and types of components, of East Texas short residue slack wax;

Fig. III is a graph showing the relationships between the melting points of the wax products and the filtration temperatures for the fractionation of a microcrystalline wax into a high melting wax and a plastic wax; and Fig. IV is a graph showing the relationship between the yield of high melting wax and the filtration temperature for the fractionation of a microcrystalline wax into a high melting wax and a plastic wax.

An East Texas crude oil was topped and the lighter fractions of hydrocarbons removed at atmospheric pressure, the remainder being recovered as a straight run residue or reduced crude. This straight run residue was then subjected to vacuum distillation to recover the distillate lubricating oil base stock contained therein, as one or more distillate fractions, including all material which was removable at about 650° F. and 130 mm. of mercury absolute pressure and obtaining therefrom a short residue waxy material, representing about 30% of the straight run residue. About 40% of the short residue was removed as asphaltic material by propane deasphalting, leaving a deasphalted short residue which was subjected to extensive extraction with phenol to remove aromatic and other polar materials which are deleterious to lubricating oils, about half of the deasphalted short residue being separated in the phenol solvent extraction process as a waxy raffinate. About half of this waxy raffinate was recovered as a high viscosity, bright lubricating stock, by dissolving the raffinate in a dewaxing solvent mixture of methyl ethyl ketone, benzene and toluene, chilling to about −10° F. to precipitate the waxes and filtering the wax from the oil. The wax was thoroughly washed on the filter, after which it was recovered therefrom as an oily wax, the so-called short residue slack wax, which may be termed short residue crude wax. The crude wax had the following properties: specific gravity (20/4° C.)—0.8936 at 100/4° C.—0.8176; refractive index,

90° C./D—1.452 color (ASTM D155-45T) at 100° C.—4½ (diluted with kerosene according to ASTM method for petrolatum darker than 8 color); dropping point (ASTM D566-42) °F.—171; methyl ethyl ketone cloud point—154° F.

The crude wax was fractionated into ten fractions by distillation in a molecular still, thereby producing ten fractions of the wax according to molecular size or weight, since the boiling points of the waxes are approximately the same for waxes of the same molecular weight, although of different types or structure. The straight-chain paraffins were separated from the other components of the various fractions by adduct formation with urea, using a saturated aqueous solution of urea to contact a methyl isobutyl ketone solution of the wax fraction. The remainder of each fraction was separated by chromatographic adsorption analysis into three type fractions, namely, (1) an isoparaffinic/naphthenic fraction, (2) a naphthenic/aromatic fraction and (3) an aromatic/resin fraction. The resulting analysis is represented diagrammatically in Fig. I, which shows the percentage of each of the four types of hydrocarbons present for any particular molecular weight. The percentage of a particular type of hydrocarbon present is given by the ordinate percentage difference of the two curves or lines which are boundaries for the region on the diagram designated for that type of hydrocarbon. Thus, it is seen that for a molecular weight of about 1065, the aromatic/resins constituted about 16%, the naphthenic/aromatics constituted about 20%, and of the 64% remaining as saturated hydrocarbons, the normal paraffin content was essentially zero. Similarly, at a molecular weight of about 810, the normal paraffin content was only about 3% of the fraction of that molecular weight, the isoparaffinc/naphthenic fraction accounting for about 73%, the naphthenic/aromatic fraction 18% and the aromatics/resin fraction 6%. This analysis of the crude wax shows, therefore, that the higher molecular weight components are not normal paraffin waxes and that the normal paraffin waxes present are largely within the lowest molecular weight ranges present.

Further consideration of the relationships shown in Fig. I would appear to offer an explanation for the fact that Wiles, in accordance with U. S. 2,306,201, was able to obtain a high melting point, ductile, microcrystalline wax of high refractive index by reducing a petrolatum stock to between 20% and 50% bottoms, by distillation, and recovering said wax from the bottoms therefrom. According to Fig. I, the indicated distillation would remove as distillate the lower molecular weight materials which would contain proportionately larger amounts of normal paraffins which contribute to hardness and brittleness of hydrocarbon waxes. For example, removal by distillation of that portion of the above crude wax as represented in Fig. I to include the material having a molecular weight up to about 575 to 600 would markedly reduce the normal paraffin content of the remaining material from which the ductile wax would be obtained according to the Wiles patent. In this connection, however, it is to be seen that by following the teaching of the Wiles patent a substantial proportion of isoparaffinic/naphthenic hydrocarbons, which contribute to ductility and microcrystallinity of the residue wax, are likewise removed therefrom along with the straight-chain paraffins. Accordingly, the wax in the distillate fraction from the Wiles operation is largely a mixture of normal paraffins and isoparaffinic and naphthenic hydrocarbons.

The foregoing appears to explain why it is generally considered that only microcrystalline, more or less ductile and plastic, hydrocarbon waxes can be obtained or produced from petroleum residues which are of a mixed-base character. However, contrary to the general beliefs relative thereto and the teachings of the art which would seem to indicate that high melting, hard, normal paraffin waxes are not obtainable from petroleum residues which yield microcrystalline, ductile waxes; at any rate in any feasible, practical manner, it has now been found that such high melting, hard, normal paraffin waxes can be obtained from such petroleum residues in a practical manner.

Although the normal paraffin hydrocarbons present in the residuum crude or slack wax occur practically exclusively in the lower molecular weight and lower boiling ranges of the total material present, it has now been found that these lower molecular weight and lower boiling, normal paraffin hydrocarbons constitute practically all of the highest melting point waxes present and that they may be separated from the other waxes present by fractional crystallization essentially only of the normal paraffin waxes from a liquid mixture of the total waxy material, preferably dissolved in a suitable solvent or diluent at a sufficiently high temperature selected to precipitate essentially only the normal paraffin waxes present as a high melting point, hard, crystalline paraffin wax. This will be more readily understood by a consideration of the relationships shown in Fig. II wherein the results of a complete melting point range-hydrocarbon type analysis are represented diagrammatically. The total slack wax was separated into a large number of fractions of very narrow melting point range, as indicated across the top of the figure, by successive fractional crystallizations at successively lower temperatures of the wax dissolved in methyl isobutyl ketone, an essentially non-selective wax solvent, followed by recrystallizations and recombinations of portions of crystal fractions into melting point ranges as indicated, followed by separations of hydrocarbon types as indicated, utilizing the method already described with reference to Fig. I. The results of this detailed analysis of the slack wax, as shown in Fig. II, make it understandable why it was possible to recover a high melting point, hard, paraffin wax from the short residue slack wax in accordance with the method of this invention as already described.

Referring to Fig. II, it will be seen that about five per cent of the total slack wax (about 7% based on deoiled slack wax since about 70% of the slack wax meets the usual definitions of wax having a melting point of at least about 25° C.) has a melting point of 87° C. or higher and that it is essentially pure normal paraffin wax. Of the 10 per cent portion of the total wax (about 15% of deoiled slack wax) which has a melting point of 81° C. or higher, 95% to 98% of it is normal paraffin wax, the other 2% to 5% being essentially all isoparaffinic. Still further, the 20 per cent portion of the total wax (30% of deoiled wax) which has a melting point of 68° C. or higher (average of about 82° C. or 180° F. and made up hydrocarbons with melting points covering a range of about 30° F.) not only comprises 75% or more of normal paraffin hydrocarbons, the remainder being essentially isoparaffinic, but that portion contains substantially all, about 95% or more, of the entire normal paraffin content of the total wax. In addition to the production of a high melting point, hard, paraffin wax by effecting the indicated separations, it is to be seen that the separation of the 15%, especially the 20%, highest melting point fraction of the total slack wax, leaves as the other wax fraction or product a wax which contains only a very minor proportion of normal paraffins, which normal paraffins are usually responsible for the hardness and brittleness of wax products containing them. Thus, the other recoverable wax product, although still a relatively high melting wax, is more amorphous or microcrystalline in character, has increased ductility and plastic properties, and has a higher refractive index corresponding to that of the more isoparaffinic, naphthenic and aromatic hydrocarbons. It is to be noted that the fraction percentages referred to and indicated in Fig. II are based on the total slack wax, about 30% of which has a melting point of below about 25° C., which in general is not considered to meet the definition of a paraffin wax which comprises material having a melting point of at least about 25° C.

In accordance with a preferred method of practicing the invention, a portion of the slack or crude wax was de-oiled as by dissolving the wax in a typical wax de-oiling solvent or solvent mixture, such as a mixture of methyl ethyl ketone, benzene and toluene, for example, 7 volumes of solvent to 1 volume of wax, at a solution temperature of about 140° F., cooling the solution to a suitable temperature such as about 60° F. to precipitate the waxes while leaving the oily components, and a portion of the lower melting wax constituents, such as those melting up to about 47° C. or 117° F., dissolved in the solvent, and filtering the slurry at about 60° F. and washing the wax with a further quantity of solvent, and recovering a primary microcrystalline wax having a melting point of about 160° F. (ASTM method D87-42). This microcrystalline wax corresponded to the slack wax represented in Fig. II, after separation approximately of those components or fractions melting below about 47° C., the remainder of approximately 50% of the slack wax being separated from the solvent and constituting a soft wax. Both waxes may be further purified by application of a conventional clay treatment followed by filtration from the clay.

The primary microcrystalline wax, which does not need to be clay treated at this stage, was then segregated into two wax products, by dissolving it in from about 5 to about 10, suitably 7, volumes of a suitable dewaxing or deoiling solvent, as already described, at a suitable elevated temperature, about 160° F. resulting in complete solution, chilling the solution to precipitate substantially only the higher melting point waxes, and filtering the precipitated high melting point, hard, paraffin wax from the solution of the softer and more ductile waxes. The latter waxes were readily recovered from the solution by distillation to remove the solvent therefrom. They may be recovered by precipitation at a lower temperature, such as the temperature of the previous deoiling. The final temperature of the crystallization and the filtration of the high melting wax is selected in accordance with the requirements of the desired products, as has been discused already with reference to Fig. II.

The effect of the filtration temperature is shown in Fig. III, wherein the two lines show the relationships between the melting points of the high melting wax and of the plastic wax and the filtration temperature at which the separation of the two waxes is effected. It is to be seen that at a filtration temperature of 100° F., a high melting wax with a melting point of 180° F. and a plastic wax with a melting point of 140° F. are obtainable, while by the use of a filtration temperature of 120° F., a high melting wax with a melting point of 190° F. and a plastic wax with a melting point of 155° F. are obtainable.

The straight line of Fig. IV shows that the yield of the high melting wax is essentially a linear function of the filtration temperature. The points representing the solvent to wax ratios, as shown in Fig. IV, show that the separation is essentially independent of the proportion of solvent present at least within the range of from 5 to 9.

The yields and properties of the high melting wax of the plastic wax obtained from the de-oiled primary microcrystalline wax at various filtration temperatures are given in Table 1.

TABLE 1

*Fractionation of East Texas short residue primary microcrystalline wax*

| Filtration Temp., °F. | Solv./Wax wt. ratio | High Melting Wax | | | | Plastic Wax | | |
|---|---|---|---|---|---|---|---|---|
| | | Yield | M. P., °F. | $n_D^{90}$ | $n_D^{90}$ from $n$-P of same M.P. | M. P., °F. | $n_D^{90}$ | Pen. at 95 °F. |
| 122 | 5 | 15 | 191 | 1.4394 | 0.0023 | 157 | 1.4440 | 30 |
| 111 | 7 | 28 | 185 | 1.4392 | 0.0036 | 149 | 1.4453 | 35 |
| 106 | 9 | 32 | 183.5 | 1.4395 | 0.0042 | 145 | 1.4450 | 46 |
| 104 | 5 | 38 | 182 | 1.4392 | 0.0042 | 142 | 1.4457 | 46 |
| 95 | 5 | 48 | 177.5 | 1.4406 | 0.0067 | 137 | 1.4467 | 55 |

The values given in the sixth column of Table 1 are for the deviation between the index of refraction as actually determined for a given wax fraction and the index of refraction of the normal (straight-chain) paraffin hydrocarbon of the same melting point as the given wax fraction, the index of refraction being determined at 90° C. utilizing the D spectral emission line of sodium. It will be seen that a filtration temperature of 122° F., the separated high melting wax had a melting point of 191° F. and an index of refraction which differed only 0.0023 unit from the index of refraction of the normal paraffin hydrocarbon which has a melting point of 191° F., thus indicating that the high melting wax was essentially pure normal paraffin wax. At a filtration temperature of 104° F., the high melting wax had a melting point of 182° F., which is still a high melting point for a commercially available wax, and its index of refraction differed from that of the normal paraffin hydrocarbon of the same melting point by only 0.0042 unit at 90° C. The penetration of this latter high melting wax was 7 at 77° F., as compared with a value of about 2-3 at 77° F. for the 191° F. melting point wax.

It has been found that the high melting waxes of relatively low index of refraction, comprising essentially and substantially only high melting point, normal paraffin hydrocarbons, are recoverable from the primary microcrystalline wax, or from the entire residual slack wax, by dissolving the wax in a suitable wax or so-called "dewaxing" solvent, such as methyl ethyl ketone, methyl isobutyl ketone, acetone, dichlorodiethyl ether, methyl isobutyl carbinol, and the like, or mixtures thereof, as well as solvents and such mixtures with aromatic hydrocarbons such as benzene, toluene, and the like, in a solvent to wax weight ratio of from about 2:1 to about 10:1, preferably from about 5:1 to about 9:1, at a temperature at least as high as about the normal melting point of the wax being treated, and generally about 150° F. to 170° F., and cooling the solvent-wax solution to a temperature from about 65° F. to about 80° F. below the desired melting point of the high melting, hard, paraffin wax which it is desired to precipitate from the solution and to recover as high melting wax. In order to recover hard wax with the highest melting point, the difference between the melting point of said wax and the filtration temperature must be at a minimum, being of the order of about 65° F. or less. For each degree change in the melting point of the hard, high melting wax, the filtration temperature will be changed by about two degrees, on the same scale. In general, the filtration temperature should be about 100° F. or higher, depending on the specific properties desired for the separated wax.

The hard, high melting hydrocarbon waxes which are recoverable in accordance with this invention are useful in a number of applications. They are particularly useful as substitutes for carnauba wax, one such wax having the following properties: melting point—184° F.; R. I. at 90° C.—1.4383; density (20/4° C.)—0.9350 g./ml.; viscosity (SUS at 210° F.)—70.6; needle penetration at 95° F.—1.17; and consisting essentially of normal paraffin hydrocarbons having melting points covering a range of at least about 20° F.; deviation of R. I. from that of n-paraffin of same melting point—0.0028. The properties of the foregoing carnauba wax substitute may be compared with the corresponding properties of a commercially available hydrocarbon wax carnauba wax substitute: M. P.—176° F.; R. I. at 90° C.—1.4552; viscosity (SUS at 210° F.)—131.8; needle penetration at 95° F.—9; deviation of R. I. from that of n-paraffin of same melting point—0.0216.

As already discussed, the present invention may be utilized to recover a high melting paraffin wax which is composed substantially only of normal paraffin hydrocarbons. On the other hand, by the use of a lower crystallization and filtration temperature, a large yield of high melting, hard, paraffin wax may be obtained which is composed for the most part of normal paraffin hydrocarbons but which also contains a minor but substantial proportion of isoparaffinic hydrocarbons of high melting point. Not only does this increase the yield of high melting wax, with only a small lowering of the melting point of the wax product, but for certain applications and especially as a carnauba wax substitute, the presence of the minor proportion of high melting isoparaffinic hydrocarbons has beneficial effects, such as the ability to retain or take up substantial proportions of mineral oil without suffering a decrease in hardness or an increase in penetration. In fact, the total of the non-straight chain paraffin wax content of the high melting point, hard paraffin waxes, such as the foregoing 184° F. melting point wax, when recovered from the straight-chain paraffins present, is a hard, high melting point wax which has excellent oil-retention properties while maintaining its hardness, thus constituting an excellent carnauba wax substitute itself, being even better than the normal paraffins in that regard.

As already indicated, the high melting waxes may be recovered from the microcrystalline wax, or from the total slack wax, or they may be recovered from the slack wax from which only the oil constituents have been removed. When the high melting wax is recovered directly from the total slack wax, as by dissolving it in a suitable proportion of a suitable solvent or diluent, followed by crystallization of substantially only the high melting, normal paraffin waxes, at a suitable elevated temperature, such as about 160° F., the plastic wax components may then be recovered, preferably by crystallization from the remaining solution at a suitable temperature such as 40° to 60° F., leaving the so-called slop or soft wax dissolved in the solvent, from which the solvent is readily recovered by distillation.

The plastic wax which is recoverable by the present process, as shown in Table 1, is a high melting point, ductile and plastic wax with the properties indicated in said table, and is advantageously useful in various applications where a wax possessing such properties is desired, such as in coating paper and paper board, applying to metal surfaces for protection against water and aqueous solutions, and the like. The plastic wax of this invention possesses certain advantages over ductile, microcrystalline waxes heretofore available, in that it does not contain the higher melting point straight-chain paraffin hydrocarbons which are present in the heretofore available microcrystalline waxes, which straight-chain hydrocarbons contribute to brittleness and low rupture loads. The method of the present invention may be applied to prepare a plastic wax having a melting point from about 157° F. down to about 130° F., a plastic wax with a melting point of about 140° F. to 150° F. being particularly valuable. A most useful plastic wax is one having a melting point of 140–145° F. and corresponding in composition to that portion of the slack wax in Fig. II which is bounded by the 47° C. (117° F.) melting range line on the lower side and the 72° C. (ca. 160° F.) melting range line on the upper melting point side. This wax contains not more than about 5% normal paraffins and is essentially composed of isoparaffinic and naphthenic hydrocarbons. It will be noted that although the plastic wax of this invention does not contain the very high melting point normal paraffins present in the usual microcrystalline waxes, as represented by those having the highest melting points in Fig. II, such as a melting point above about 190° F., the melting point of the plastic wax is still relatively high for a plastic wax, which is due in part at least to the fact that the lower melting isoparaffinic and naphthenic hydrocarbons are separated in the soft wax. As will be understood from the foregoing, one or several plastic wax products may be prepared depending on the desired properties, by proper selection of filtration temperatures to separate the desired plastic wax or waxes.

As already indicated, the present invention is applicable to the processing of high molecular weight, petroleum residual wax products comprising principally paraffinic and naphthenic materials. Thus, instead of applying the invention to East Texas residual wax stocks, it may be applied to corresponding residual wax stocks derived from petroleum crudes of a paraffinic-naphthenic base, or even largely of a normal paraffinic-isoparaffinic base. In general, therefore, it is applicable to all paraffinic base crudes, which may or may not contain substantial proportions of naphthenic hydrocarbons; certain proportions of aromatic and asphaltic materials may be present just so long as the asphaltic content is not so predominating in the residuum that it cannot be effectively separated from the waxes by deasphalting and solvent extraction operations. The characteristics and identities of other suitable stocks will be well understood by those skilled in the art, in view of the foregoing description of the invention.

The invention has been described broadly and a detailed description thereof has been given with reference to preferred applications thereof, with a description of the various factors pertaining thereto. It will be understood from the description of the invention that various modifications may be made within the scope and spirit of the invention, such as the selection of particular solvents, particular crystallization and filtration temperatures, combinations of sequential operations, and the like.

I claim as my invention:

1. The method of producing a hard, high melting, hydrocarbon wax product and a plastic, high melting, paraffin wax product from a deasphaltized and selective solvent extracted paraffinic-naphthenic short residue crude wax which comprises dissolving the crude wax in a dewaxing solvent at an elevated temperature, cooling the solution and separating the resulting solid wax from the remaining solution at a temperature of about 40° to 60° F., thereby recovering a high melting, microcrystalline hydrocarbon wax, dissolving the microcrystalline wax in a dewaxing solvent at an elevated temperature, cooling the solution and separating the resulting solid wax from the remaining solution at a temperature at least as high as 100° F., thereby recovering a high melting, hard, hydrocarbon wax product and recovering the remaining wax components from the solvent of the separated solution, as a relatively high melting, plastic hydrocarbon wax.

2. The method of producing a hard, high melting, hydrocarbon wax product and a plastic, high melting, paraffin wax product from a deasphaltized and selective solvent extracted paraffinic-naphthenic short residue crude wax which comprises dissolving the crude wax in a dewaxing solvent at an elevated temperature, cooling the solution and separating the resulting solid wax from the remaining solution at a temperature at least as high as 100° F., thereby recovering a high melting, hard, hydrocarbon wax product, cooling the separated remaining solution to a temperature of about 40° to 60° F. to precipitate therefrom a relatively high melting, plastic, hydrocarbon wax, and separating the precipitated plastic wax from the remaining solution of the other constituents of the crude wax.

3. The method of producing a hard, high melting, hydrocarbon wax product and a plastic, high melting, paraffin wax product from an East Texas deasphaltized and selective solvent extracted short residue crude wax which comprises dissolving the crude wax in a dewaxing solvent at an elevated temperature, cooling the solution and separating the resulting solid wax from the remaining solution at a temperature of about 40° to 60° F., thereby recovering a high melting, microcrystalline hydrocarbon wax, dissolving the microcrystalline wax in a dewaxing solvent at an elevated temperature, cooling the solution and separating the resulting solid wax from the remaining solution at a temperature at least as high as 100° F., thereby recovering a high melting, hard, hydrocarbon wax product, and recovering the remaining wax components from the solvent of the separated solution, as a relatively high melting, plastic hydrocarbon wax.

4. The method of producing a hard, high melting, hydrocarbon wax product and a plastic, high melting, hydrocarbon wax product from an East Texas deasphaltized and selective solvent extracted short residue crude wax which comprises dissolving the crude wax in a dewaxing solvent at an elevated temperature, cooling the solution and separating the resulting solid wax from the remaining solution at a temperature at least as high as 100° F., thereby recovering a high melting, hard hydrocarbon wax product, cooling the separated remaining solution to a temperature of about 40° to 60° F. to precipitate therefrom a relatively high melting, plastic, hydrocarbon wax, and separating the precipitated plastic wax from the remaining solution of the other constituents of the crude wax.

5. The method of producing a hard, high melting, hydrocarbon wax product from an East Texas petroleum residuum waxy oil, which comprises deasphalting the residuum waxy oil, solvent extracting the deasphaltized waxy oil with a selective solvent for aromatic hydrocarbons and producing a waxy raffinate oil product, solvent dewaxing the waxy raffinate oil to separate an oily wax product from dewaxed oil, dissolving the oily wax product in a dewaxing solvent, cooling the solution and filtering the resultant slurry of solid wax and remaining solution at a temperature of about 40° to about 60° F., thereby recovering a microcrystalline hydrocarbon wax, dissolving the microcrystalline wax in a dewaxing solvent, cooling the solution and filtering the resultant slurry of solid wax and remaining solution at a temperature at least as high as about 100° F., thereby recovering a hard, high melting, hydrocarbon wax product consisting essentially of normal paraffin hydrocarbons and isoparaffinic hydrocarbons, the normal paraffin content of which is at least about 75%.

6. The method of producing a hard, high melting, hydrocarbon wax product and a plastic, high melting, hydrocarbon wax product from an East Texas deasphaltized and selective solvent extracted short residue slack wax which comprises dissolving the slack wax in a dewaxing solvent at an elevated temperature, cooling the solution to a temperature of about 40° to about 60° F. to precipitate therefrom a high melting, microcrystalline, hydrocarbon wax product, separating the microcrystalline wax from the remainder of the solution, dissolving the microcrystalline wax in a dewaxing solvent at an elevated temperature, cooling the solution to a temperature at least as high as about 100° F. to precipitate therefrom a high melting, hard, hydrocarbon wax product consisting essentially of normal paraffin hydrocarbons and isoparaffinic hydrocarbons, the normal paraffin content of which is from about 75% to about 98%, separating the precipitated high melting hydrocarbon wax product from the remaining solution, and separating the solvent from the remaining microcrystalline wax constituents dissolved therein to produce a relatively high melting, plastic paraffin wax product.

7. The method in accordance with claim 6, wherein the dewaxing solvent is a methyl ethyl ketone-toluene-benzene dewaxing solvent and is used in the proportions of about 5 volumes of solvent per volume of microcrystalline wax in the operation where the microcrystalline wax is separated into the two wax fractions, and wherein the solvent wax fractionation of the microcrystalline wax is carried out at a temperature of about 120° F.

8. A high melting, plastic, hydrocarbon wax product having a melting point of about 140° to about 145° F. and comprising predominantly a mixture of isoparaffinic and naphthenic hydrocarbons having melting points substantially coextensive with the range of from about 117° F. to about 160° F. and containing only a minor proportion, not over about 5% of normal paraffins.

9. A high melting, plastic, hydrocarbon wax product having a melting point of from about 130° F. to about 157° F. and comprising predominantly a mixture of isoparaffinic and naphthenic hydrocarbons having melting points substantially throughout the range of from about 117° F. to about 160° F. and being essentially free from normal paraffin hydrocarbons having melting points above about 190° F.

KAREKIN G. ARABIAN.

References Cited in the file of this patent

UNITED STATES PATENTS

| Number | Name | Date |
|---|---|---|
| 2,157,625 | Page | May 9, 1939 |
| 2,234,916 | Jones | Mar. 11, 1941 |
| 2,330,740 | Pokorny et al. | Sept. 28, 1943 |
| 2,380,078 | Schutte | July 10, 1945 |
| 2,443,840 | Stossel | June 22, 1948 |
| 2,486,014 | Evans | Oct. 25, 1949 |

OTHER REFERENCES

Sachanen, "Chemical Constituents of Petroleum," pages 286–299. Copyright 1945 by Reinhold Publishing Corp., New York.